(12) United States Patent
Bonacchi et al.

(10) Patent No.: US 8,919,191 B2
(45) Date of Patent: Dec. 30, 2014

(54) USE OF A COORDINATION COMPLEX OR COMPOUND FOR THE MEASUREMENT OF TEMPERATURE

(75) Inventors: Sara Bonacchi, Pistoia (IT); Marco Montalti, Calderara Di Reno (IT); Luca Prodi, Bologna (IT); Nelsi Zacheroni, Bologna (IT); Francesco Zerbetto, Bologna (IT); Matteo Calvaresi, Bologna (IT); Daniele Cauzzi, Parma (IT)

(73) Assignee: Alma Mater Studiorum—Universita' di Bologna, Bologna (IT)

( * ) Notice: Subject to any disclaimer, the term of this patent is extended or adjusted under 35 U.S.C. 154(b) by 68 days.

(21) Appl. No.: 13/881,557

(22) PCT Filed: Oct. 26, 2011

(86) PCT No.: PCT/IB2011/054785
§ 371 (c)(1),
(2), (4) Date: Jul. 31, 2013

(87) PCT Pub. No.: WO2012/056415
PCT Pub. Date: May 3, 2012

(65) Prior Publication Data
US 2013/0301679 A1    Nov. 14, 2013

(30) Foreign Application Priority Data

Oct. 26, 2010 (IT) .............................. BO2010A0640
Oct. 26, 2010 (IT) .............................. BO2010A0641

(51) Int. Cl.
| | |
|---|---|
| G01L 5/04 | (2006.01) |
| G01K 11/00 | (2006.01) |
| C09K 9/02 | (2006.01) |
| G01K 11/20 | (2006.01) |

(52) U.S. Cl.
CPC . G01K 11/00 (2013.01); C09K 9/02 (2013.01); G01K 11/20 (2013.01)
USPC .............................................. 73/159; 73/160

(58) Field of Classification Search
USPC ..................................................... 73/159, 160
See application file for complete search history.

(56) References Cited

FOREIGN PATENT DOCUMENTS

| | | |
|---|---|---|
| EP | 1 391 708 A1 | 2/2004 |
| EP | 1391708 A1 * | 2/2004 |
| EP | 1 936 345 A1 | 6/2008 |

OTHER PUBLICATIONS

Engeser, Marianne, et al., "A Fluorescent Molecular Thermometer Based on the Nickel(II) High-Spin/Low-Spin Interconversion," *Chemical Communications*, No. 13, pp. 1191-1192 (Jan. 1, 1999).

Fujino, Nozomi, et al., "A Molecular Thermometer Based on Luminescence of Copper(II) Tetraphenylporphyrin," *Thin Solid Films*, vol. 518, No. 2, Elsevier-Sequoia S.A. Lausanne, CH, pp. 563-566 (Nov. 30, 2009).

Kruk, M., et al., "Molecular Thermometer for Cryogenic Range Based on Pd-porphin Phosphorescence," SPIE, vol. 6733, pp. 1-7 (2007).

Pattacini, Roberto, et al., "Zwitterionic Metalates of Group 11 Elements and Their Use as Metalloligands for the Assembly of Multizwitterionic Clusters," *Journal of the American Chemical Society*, vol. 128, No. 3, pp. 866-876 (Jan. 1, 2006).

International Search Report in international application No. PCT/IB2011/054785, dated Apr. 5, 2012.

* cited by examiner

*Primary Examiner* — Lisa Caputo
*Assistant Examiner* — Jamel Williams
(74) *Attorney, Agent, or Firm* — Marshall, Gerstein & Borun LLP

(57) ABSTRACT

Use for measuring temperatures of a coordination complex presenting formula I, wherein $M^1$, $M^2$, $M^3$, $M^4$, $M^5$ are chosen, each independently of the others, in the group consisting of: $Cu^I$, $Ag^I$, $Au^I$, $Pd^{II}$; n is equal to the sum of the oxidation states of $M^1$, $M^2$, $M^3$, $M^4$, $M^5$ minus 3; II represents a respective portion of each tridentate ligand having the formula III in which $R^1$ is chosen in the group consisting of: Ph, $C^1$-$C^4$ alkyl, halo-alkyl $C^1$-$C^4$ substituted phenyl; $R^2$ is chosen in the group consisting of: Ph, $C_1$-$C_4$ alkyl, $C_1$-$C_4$ halo-alkyl-, substituted phenyl; $R^3$ is chosen in the group consisting of: $C_1$-$C_{18}$ alkyl, benzyl, substituted benzyl, $C_1$-$C_{20}$ hydroxy-alkyl, $C_1$-$C_{20}$ alkoxy silane.

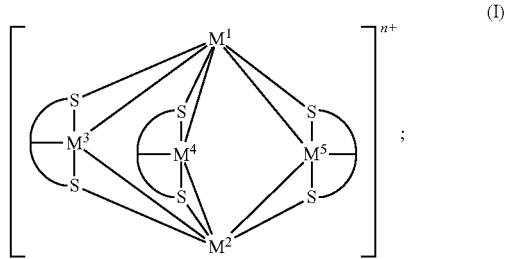
(I)

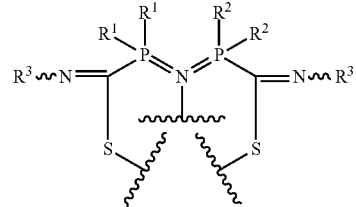
(II)

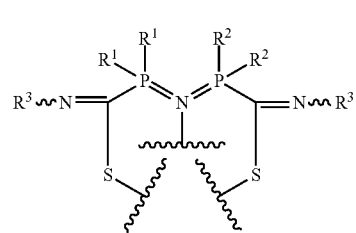
(III)

16 Claims, 7 Drawing Sheets

USE OF A COORDINATION COMPLEX OR COMPOUND FOR THE MEASUREMENT OF TEMPERATURE

CROSS-REFERENCE TO RELATED APPLICATIONS

This is the U.S. national phase of International No. PCT/IB2011/054785, filed Oct. 26, 2011, which claims the benefit of Italian patent Application No. BO2010A000641 filed Oct. 26, 2010 and Italian patent Application No. BO2010A000640 filed Oct. 26, 2010.

TECHNICAL FIELD

The present invention relates to the use of a coordination compound for measuring temperatures and a device for measuring temperatures.

BACKGROUND OF THE INVENTION

To date many types of thermometers have been proposed. In particular, with the advent of nanotechnology, different techniques for measuring temperatures have been developed in very small length scales such as: scanning thermal microscopy (Scanning Thermal Microscopy—SthM—L. Shi, A. Majumdar, "Recent developments in micro and nanoscale thermometry", Microsc. Thermophys. Eng. 2001, 5, 251-265), spectroscopy (Raman J. W. Pomeroy, M. Kuball, D. J. Wallis, A. M. Keir, K. P. Hilton, R. S. Balmer, M. J. Uren, T. Martin, P. J. Heard, "Thermal mapping of defects in AlGaN/GaN heterostructure field-effect transistors using micro-Raman spectroscopy", Appl. Phys. Lett. 2005, 87, 103508), thermo-reflectance microscopy (thermo-reflectance microscopy—S. Dilhaire, D. Fournier, G. Tessier, "Microscale and Nanoscale Heat Transfer", (Ed.: S. Volz), Springer-Verlag, Heidelberg, Germany 2007).

Several molecules have been proposed as luminescent molecular thermometers in a review of the series "Chemistry for Everyone" (S. Uchiyama, A. P. de Silva, K. Iwai, "Luminescent Molecular Thermometers: J. Chem. Ed. 2006, 83, 720-727).

The molecules so far reported in the literature show one or more of the following disadvantages.
- small temperature range for their potential use (a few degrees Celsius);
- sensitivity greater than a tenth of a Celsius degree;
- reduced chemical and photochemical stability;
- high cost of synthesis;
- possibility to use only under certain conditions, for example, only in solution and/or only in solid form;
- significant changes in behavior according to the conditions (for example, depending on the solvent in which the molecule is dissolved or if the molecule is in a solid or liquid state);
- in the presence of oxygen the intensity of fluorescence decreases (which interferes with the proper functioning of thermometers that contain these molecules).

In particular, note that some of the best molecules so far proposed have a sensitivity of about 0.5° C. (C. Gota, K. Okabe, T. Funatsu, Y. Harada, S. Uchiyama, "Hydrophilic Fluorescent Nanogel Thermometer for Intracellular Thermometry", J. Am. Chem. Soc. 2009, 131, 2766-2767; C. Gota, S. Uchiyama, T. Yoshihara, S. Tobita, T. Ohwada, "Temperature-Dependent Fluorescence Lifetime of a Fluorescent Polymeric Thermometer, Poly(N-isopropylacrylamide), Labeled by Polarity and Hydrogen Bonding Sensitive 4-Sulfamoyl-7-aminobenzofurazan", J. Phys. Chem. B 2008, 112, 2829-2836).

Recently, a class of zwitterionic metalates has been introduced and characterized. These metalates have been proposed as potential catalysts (R. Pattacini, L. Barbieri, A. Stercoli, D. Cauzzi, C. Graiff, M. Lanfranchi, A. Tiripicchio, L. Elviri, "Zwitterionic metalates of group 11 elements and their use as metalloligands for the assembly of multizwitterionic clusters", J. Am. Chem. Soc., 2006, 128, 866-876; Cauzzi et al., "Coordination properties of the multifunctional S,N,S zwitterionic ligand EtNHC(S)Ph$_2$P=NPPh$_2$C(S)Net", Coordination Chemistry Reviews 254 (2010) 753-764). No other potential use of these zwitterionic metalates has been proposed and, in particular, no study for the exploitation of their photophysical properties in relation to temperature was never made, suggested or even only hypothesized.

The aim of the present invention is to provide the use of a coordination complex for measuring temperatures and a device for measuring temperatures, which allow to overcome, at least partially, the problems of the state of the art and that are at the same time, of cheap and easy implementation.

SUMMARY

According to this invention we provide the use of a coordination complex for measuring temperatures and a device for measuring temperatures according to what is recited in the following independent claims and, preferably, in any of the dependent claims directly or indirectly from the independent claims.

Unless it is explicitly specified otherwise, the following terms have the after-mentioned meanings:

In this text "$C_x$-$C_y$" is referring to a group possessing a number of carbon atoms from x to y.

In this text, the term "aliphatic" refers to a non-aromatic, non substituted hydrocarbon, that can be saturated or unsaturated, linear, branched and/or cyclic. Non-exhaustive examples of aliphatic groups are: t-butyl, ethenyl, 1- or 2-propenyl, cyclohexyl.

In this text, the term "alkyl" means a saturated aliphatic group (i.e. an aliphatic group with no double or triple carbon-carbon bonds). Non-exhaustive examples of alkyl are methyl, n-propyl, t-butyl, cyclohexyl.

In this text, the term "halo-alkyl" means an alkyl group which has one or more halogen substituents. According to some embodiments, the halogen substituent or the halogen substituents (when more than one) is/are fluorine.

In this text, the term "substituted phenyl" means a phenyl group attached to at least one substituent, which is advantageously chosen in the group consisting of: $C_1$-$C_4$ aliphatic, $C_1$-$C_3$ halo-alkyl, halogen, hydroxy, $C_1$-$C_4$ alkoxy, $NH_3$—, amine $C_1$-$C_4$, —CN, —NO$_2$, $C_1$-$C_3$ carboxyalkyl-, $C_1$-$C_3$ alkanoyl. According to some embodiments, the phenyl substituent is bonded to only one substituent. In particular, the substituent is placed in para position in relation to the other moiety of the molecule. According to some embodiments, the substituent is selected in the group consisting of: $C_1$-$C_4$ alkyl, $C_1$-$C_4$ alkyl halogens, halogen, $C_1$-$C_3$ alkoxy, —CN.

In this text, the term "substituted benzyl" means a group presenting the following formula:

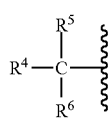

wherein $R^4$ is a substituted phenyl, $R^5$ and $R^6$ are chosen, independently of each other, in the group consisting of: H, $C_1$-$C_6$ alkyl, phenyl, substituted phenyl. According to some embodiments, $R^5$ and $R^6$ are chosen, independently of each other, in the group consisting of H, $C_1$-$C_4$ alkyl, phenyl, substituted phenyl. In particular, $R^5$ and $R^6$ are both an H.

In this text, the term "alkoxy" means an aliphatic (in particular alkyl, advantageously $C_1$-$C_4$, advantageously $C_1$-$C_3$) bound to the remaining molecular moiety via an oxygen atom. Non-limitative examples of alkoxy groups are: methoxy, ethoxy.

The term "alcanoyl", as used in this text, represents an aliphatic group linked to the rest of the molecule via a carbonyl group.

The term "carboxyalkyl", as used in this text represents an alkoxy group attached to the remainder of the molecule via a carbonyl group.

Unless explicitly stated otherwise, the contents of references (articles, books, patent applications, etc.) cited in this text is herein recalled in its entirety for completeness of description. In particular, the mentioned references are incorporated herein by reference.

BRIEF DESCRIPTION OF FIGURES

The present invention will now be described with reference to the attached drawings, which illustrate examples of non-limiting implementation, where.

EMBODIMENTS OF THE INVENTION

Figure 1:
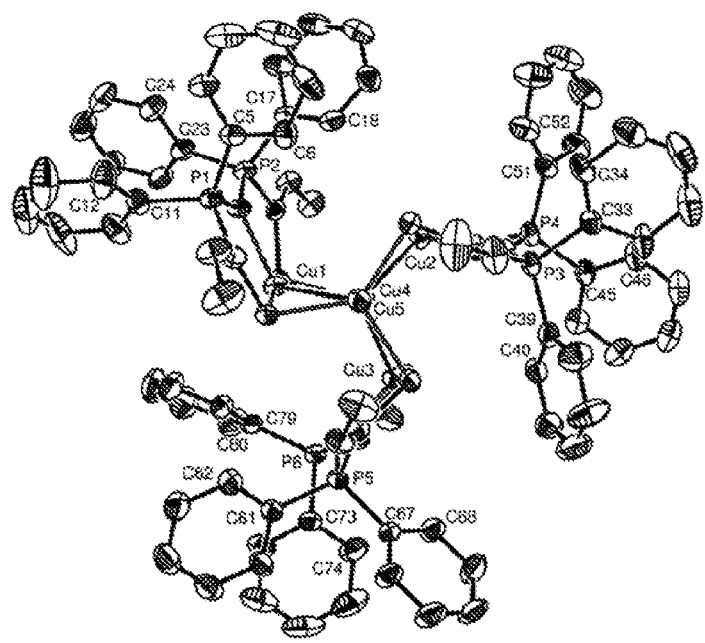
FIG. 1 shows the crystal structure of a coordination complex used in the present invention.

According to a first aspect of the present invention, it is provided a use of a coordination complex for measuring temperatures. The coordination complex includes at least two metal atoms bound to each other and at least one ligand bound to at least one of the metal atoms. The coordination complex (in particular, the ligand or the ligands) comprises at least two heteroatoms, each of which form a coordination bond with at least one respective metal atom.

According to some embodiments, the complex has at least two ligands. In particular, the complex has three ligands.

Advantageously, each ligand is a polydentate ligand. In particular, each ligand is tridentate.

According to some embodiments, the coordination complex includes five metal atoms.

The complex has a LUMO with a density computed by Löwdin population analysis (Löwdin population analysis— P.-O. Löwdin. J. Chem. Phys. 18 (1950), p. 365.) on the metal atoms and heteroatoms higher than 48% and a LUMO+1 with a density computed by Löwdin population analysis (Löwdin population analysis) on the metal atoms and heteroatoms lower than 20%. In particular, the calculations are performed at 0 K, temperature (reference temperature) at which the absolute energy of different states is usually determined.

According to some embodiments, the LUMO has a density computed using the Löwdin population analysis on the metal atoms and heteroatoms higher or equal to 50%. According to some embodiments, the LUMO+1 has a density computed using the Löwdin population analysis on the metal atoms and heteroatoms lower than 10%.

The coordination complex has at least one excited state with the LUMO as a final orbital, and at least one excited state with the LUMO+1 as final orbital. The coordination complex emits at a determined wavelength when it passes from the excited state on the LUMO to the ground state. When the coordination complex passes from the excited state located on the LUMO+1 to the ground state, the coordination complex does not emit at the specific wavelength. In particular, when the coordination complex passes from the excited state located on the LUMO+1 to the ground state, the coordination complex itself dissipates energy into heat.

Advantageously, the sum of the oscillator strengths (oscillator Strengths) ($f_0$) of the excited states (namely of the excited state) with the LUMO as final orbital is at least 20 times more than the sum of the oscillator strengths ($f_0$) of the excited states (namely the excited state) with the LUMO+1 as final orbital. Advantageously, the sum of the oscillator strengths (oscillator Strengths) ($f_0$) of the excited states with the LUMO as final orbital is at least 40 times more than the sum of the oscillator strengths ($f_0$) of the excited states with the LUMO+1 as final orbital.

The calculation method of $f_0$ is described in P. W. Atkins, Molecular Quantum Mechanics, Second Edition, Oxford University Press, Oxford, UK, 1983, pages 447-449.

According to another aspect of the present invention (dependent from or in place of the aforementioned first aspect of the present invention) we provide the use of a coordination complex for measuring temperatures, wherein the coordination complex has the following structural formula I:

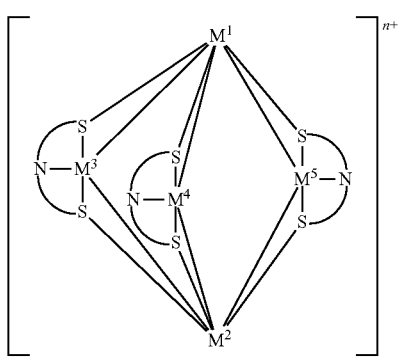 (I)

or its geometric isomers, its optically active forms, diastereomers, its racemes, wherein $M^1$, $M^2$, $M^3$, $M^4$, $M^5$ are chosen, each independently from the others, in the group consisting of: $Cu^I$, $Ag^I$, $Au^I$, $Pd^{II}$, $Rh^I$;

n is equal to the sum of the oxidation states of $M^1$, $M^2$, $M^3$, $M^4$, $M^5$, minus 3;

each portion II

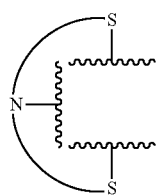 (II)

represents a corresponding tridentate ligand having the formula III:

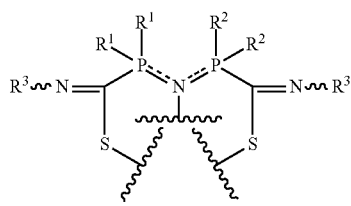 (III)

in which $R^1$ is chosen in the group consisting of: Ph, $C_1$-$C_4$ alkyl, $C_1$-$C_4$ halo-alkyl, substituted phenyl;

$R^2$ is chosen in the group consisting of: Ph, $C_1$-$C_4$ alkyl, $C_1$-$C_4$ halo-alkyl, substituted phenyl;

$R^3$ is selected in the group consisting of: $C_1$-$C_{20}$ alkyl, benzyl, substituted benzyl, hydroxy $C_1$-$C_{20}$ alkyl, $C_1$-$C_{20}$ alkoxy silane.

An alkoxy silane is a silane (monosilane—$SiH_4$) with at least one substituent which is an alkoxy (in particular, the alkoxy silane has three substituents).

In other words, advantageously, the alkoxy silane has the formula $R^Z{}_3Si$—$R^P$, wherein $R^Z$ is a silicon-bound alkoxy and $R^P$ is chosen in the group consisting of: a bond (direct) with the rest of the molecule (more precisely nitrogen) an alkyl group (linear) $C_1$-$C_5$ (in particular, $C_2$-$C_3$, more precisely $C_3$). According to some embodiments, $R^Z$ is a $C_1$-$C_3$ alkoxy (in particular, $C_1$-$C_2$). According to specific embodiments, $R^3$ is chosen in the group consisting of:

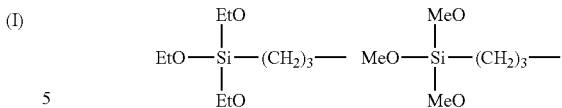

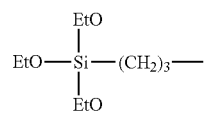

(in particular, $R^3$ is).

In particular, the tridentate ligand has the formula IIIa:

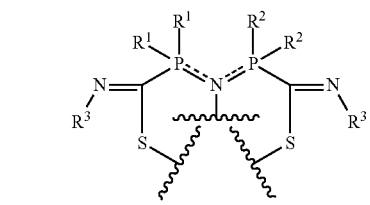 (IIIa)

Advantageously, the portions II are equal to each other.

According to some embodiments, $R^1$ is chosen in the group consisting of: Ph, $C_1$-$C_3$ alkyl, halo-alkyl $C_1$-$C_3$, substituted phenyl.

According to some embodiments, $R^1$ is chosen in the group consisting of: Ph, $CH_3$, $CF_3$, $(CH_3)_2CH$—, $(CF_3)_2CH$—, $(CH_3)(CF_3)CH$—, p-Me$(C_6H_4)$—, p-$CH_3O(C_6H_4)$—, p-(t-Bu)$(C_6H_4)$—, p-Cl$(C_6H_4)$—, p-F$(C_6H_4)$—, p-CN$(C_6H_4)$—, pEt$(C_6H_4)$—, p-$CF_3(C_6H_4)$—.

According to some particular embodiments, $R^1$ is Ph.

According to some embodiments, $R^2$ is chosen in the group consisting of: Ph, $C_1$-$C_3$ alkyl, halo-alkyl $C_1$-$C_3$, substituted phenyl. In particular, $R^2$ is chosen in the group consisting of: Ph, $C_1$-$C_3$ alkyl, halo-alkyl $C_1$-$C_3$.

According to some embodiments, $R^2$ is chosen in the group consisting of: Ph, $CH_3$, $CF_3$, $(CH_3)_2CH$—, $(CF_3)_2CH$—, $(CH_3)(CF_3)CH$—. In particular, $R^2$ is Ph.

According to some embodiments $R^3$ is chosen in the group consisting of: $C_1$-$C_{18}$ alkyl, benzyl, substituted benzyl, hydroxy-alkyl $C_1$-$C_{18}$, alkoxy silane. In particular, $R^3$ is chosen in the group consisting of: $C_1$-$C_{18}$ alkyl, benzyl, substituted benzyl.

According to some embodiments, $R^3$ is chosen in the group consisting of: alkyl (linear) $C_1$-$C_{18}$, $(CH_3)_2CH$—, $CH_3CH(CH_3)CH_2$—, $(CH_3)_3CH_2$—, $PhCH_2$—, $Ph_2CH$—, $Ph_3C$—, $Ph(CH_3)CH$—, $Ph(CH_3CH_2)CH$—, $Ph(n-Pr)CH$—, $Ph(n-Bu)CH$—, $Ph(CH_3)_2O$—, $Ph_2CH_3C$—, p-Me $(C_6H_4)CH_2$—, p-$CH_3O(C_6H_4)CH_2$—, p-(t-Bu)$(C_6H_4)CH_2$—, p-Cl$(C_6H_4)CH_2$—, p-F$(C_6H_4)CH_2$—, p-CN$(C_6H_4)CH_2$—, p-Et$(C_6H_4)CH_2$—, p-$CF_3(C_6H_4)CH_2$—.

According to some embodiments, $R^3$ is a $C_1$-$C_{12}$ alkyl.

According to some embodiments, $R^3$ is a linear alkyl.

$M^1$, $M^2$, $M^3$, $M^4$, $M^5$ are chosen, each independently of the others, in the group consisting of: $Cu^I$, $Ag^I$, $Au^I$, $Pd^{II}$, $Rh^I$. According to some embodiments, $M^1$, $M^2$, $M^3$, $M^4$, $M^5$ are chosen, each independently of the others, in the group consisting of: $Cu^I$, $Ag^I$, $Au^I$. In particular, $M^1$, $M^2$, $M^3$, $M^4$, $M^5$ are chosen, each independently of the others, in the group consisting of: $Cu^I$, $Ag^I$, $Au^I$.

Advantageously, $M^1$, $M^2$, $M^3$, $M^4$, $M^5$ are chosen, each independently of the others, in the group consisting of: $Cu^I$, $Ag^I$. According to some embodiments, $M^1$, $M^2$ are each a respective $Cu^I$ and $M^3$, $M^4$, $M^5$ are, each, a corresponding $Ag^I$. According to some embodiments, $M^1$, $M^2$ are respective $Ag^I$ and $M^3$, $M^4$, $M^5$ are respective $Cu^I$.

According to some embodiments, $M^1$, $M^2$, $M^3$, $M^4$, $M^5$ are, each, a corresponding $Ag^I$.

Advantageously, $M^1$, $M^2$, $M^3$, $M^4$, $M^5$ are, each, a respective $Cu^I$. Noteworthy, in this case, the coordination complex has an essentially monoexponential decay from the excited state. Therefore, the ln $(1/\tau)$ (wherein $\tau$ is the lifetime) is substantially directly proportional to RT. This makes particularly easy and accurate the measurement of the temperature for a large range of temperatures.

According to particular embodiments, the coordination complex is selected in the group consisting of: $[Cu_2\{Cu\text{-}(MeSNS)\}_3]^{2+}$, $[Ag_2\{Cu\text{-}(MeSNS)\}_3]^{2+}$, $[Ag_2\{Ag\text{-}(MeSNS)\}_3]^{2+}$, $[Cu_2\{Cu\text{-}(EtSNS)\}_3]^{2+}$, $[Ag_2\{Cu\text{-}(EtSNS)\}_3]^{2+}$, $[Ag_2\{Ag\text{-}(EtSNS)\}_3]^{2+}$, $[Cu_2\{Cu\text{-}(DoDecSNS)\}_3]^{2+}$, $[Ag_2\{Cu\text{-}(DoDecSNS)\}_3]^{2+}$, $[Ag_2\{Ag\text{-}(DoDecSNS)\}_3]^{2+}$.

MeSNS indicates:

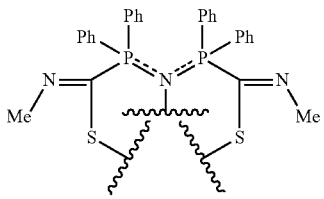

wherein Me denotes a methyl.
EtSNS indicates:

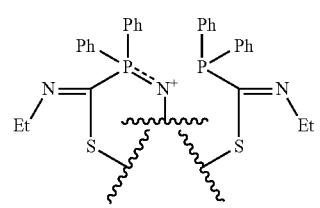

wherein Et indicates an ethyl.
DoDecSNS indicates:

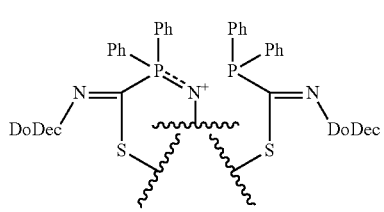

wherein DoDec indicates a dodecyl ($C_{12}H_{25}$—).

Advantageously, the coordination complex is chosen in the group consisting of $[Cu_2\{Cu\text{-}(MeSNS)\}_3]^{2+}$, $[Cu_2\{Cu\text{-}(EtSNS)\}_3]^{2+}$, $[Cu_2\{Cu\text{-}(DoDecSNS)\}_3]^{2+}$.

The crystal structure of the cation $[Cu_2\{Cu\text{-}(MeSNS)\}_3]^{2+}[PF_6]_2^-$ is illustrated in FIG. 1.

Figure 3:
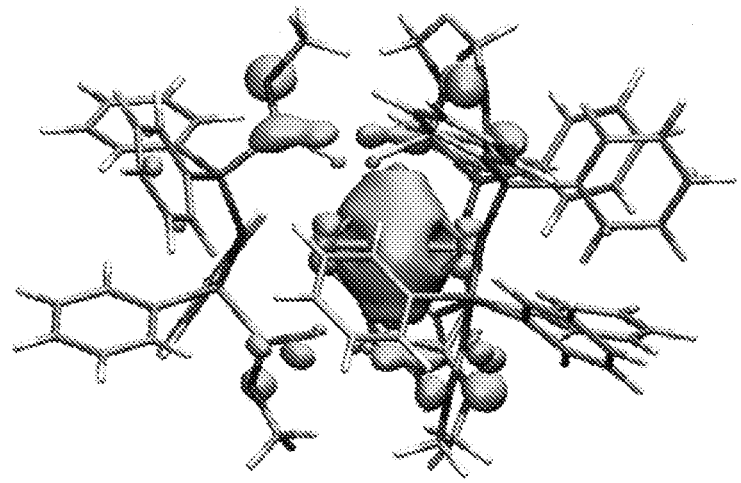
FIG. 3 illustrates the LUMO of the complex of FIG. 1.
Figure 4:
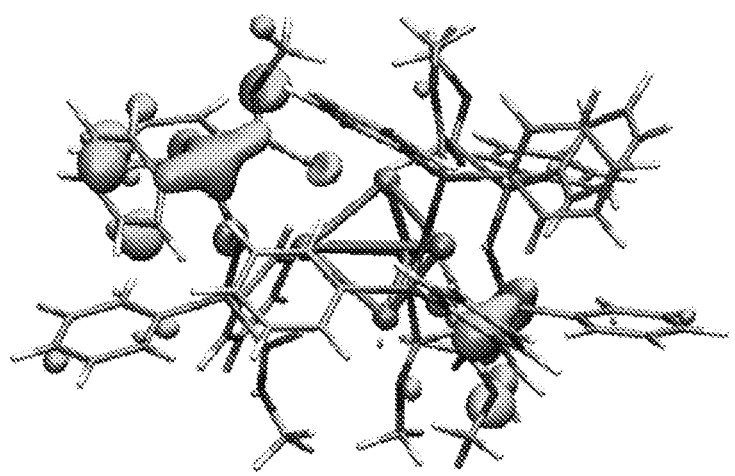
FIG. 4 shows the LUMO+1 of the complex of FIG. 1.

The LUMO and LUMO+1 of $[Cu_2\{Cu\text{-}(MeSNS)\}_3]^2$ are shown in FIGS. 3 and 4, respectively.

Figure 2:
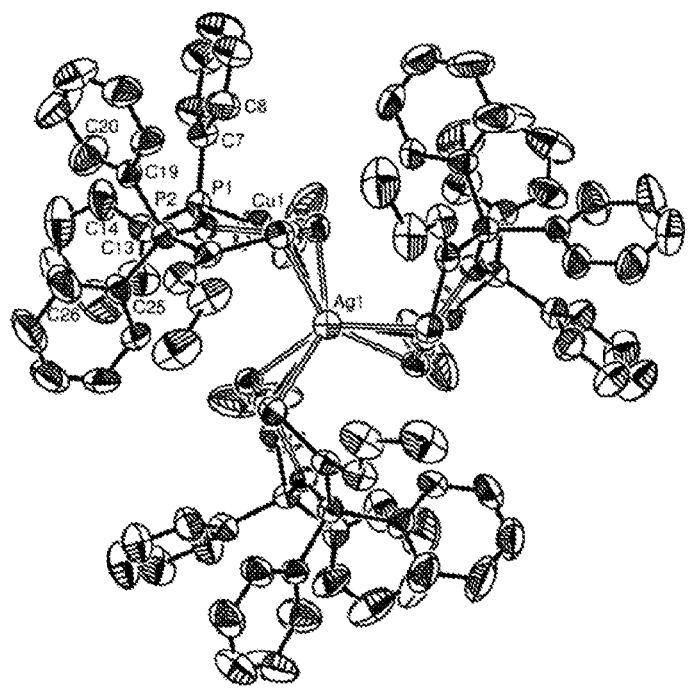
FIG. 2 illustrates the crystal structure of another coordination complex used in the present invention.

The crystal structure of $[Ag_2\{Cu\text{-}(EtSNS)\}_3]^{2+}[BF_4]_2^-$ is illustrated in FIG. 2.

In some embodiments, the use (that is to say the temperature measurement method) includes a step of directing at least one electromagnetic radiation on the coordination complex; one step of detection of at least one electromagnetic emission of the coordination complex; one step of temperature calculation on the basis of a photophysical property of the coordination complex chosen among a group consisting of: lifetime of the excited state; luminescence intensity of the electromagnetic emission.

In some embodiments, the photophysical property on which is based the temperature calculation is the excited state lifetime.

In some embodiments, the photophysical property on which is based the temperature calculation is the fluorescence intensity.

Advantageously, the photophysical property on which is based the temperature calculation is the excited state lifetime.

In this respect, it has to be noted that the use of the lifetime presents an additional advantage that is to say that it does not need any calibration depending from the medium where the coordination complex is inserted. Measurements of the fluorescence intensity (that is expressed in arbitrary units) are, on the contrary, influenced by many experimental features, such as: the intensity of the irradiated radiation; the detector response; the sample position; the kind of medium, that can act essentially as a filter.

Lifetime means the inverse of the sum of the kinetic constants according to which an excited state decays. In the case of a substantially monoexponential decay, the lifetime corresponds to the time needed for the excited states population to decrease to 1/e (that is to say of e times).

The lifetime is measured, in particular, with Time-Correlated Single-Photon Counting (TCSPC—whose principles are, for example, described in J. R. Lakowicz, "Principles of Fluorescence Spectroscopy", Springer, 2006).

In some embodiments, the coordination complex is inserted in the biological substrate. The biological substrate can be a biological sample (for example a sample of cells) or a superior organism.

It has been experimentally observed that the complex is stable in different conditions (in particular in dimethylsulfoxide solutions).

When the coordination complex is inserted in a biological sample, the step of the detection of the electromagnetic emission of the coordination complex is performed with a confocal fluorescence microscope.

In some embodiments, the coordination complex is in the form of (is part of) a coordination compound including the coordination complex (with neutral charge) and at least a negatively charged counter ion.

In some embodiments, the counter ion/s is/are chosen among a group consisting of: $PF_6^-$, $OTf^-$, $BF_4^-$.

In agreement with a third aspect of the present invention, a device for the measurement of temperature is provided, including an electromagnetic source for the direction of at least one electromagnetic radiation (in particular a luminous one) on a coordination compound as defined in agreement with the first and/or the second aspect of the present invention. The device includes, moreover, a detector to detect an electromagnetic emission of the coordination complex; and a control unit to calculate the temperature on the basis of one photophysical property of the electromagnetic emission of the coordination compound.

In some embodiments, the photophysical property of the coordination complex is chosen among a group consisting of: lifetime of the excited state; luminescence intensity of the electromagnetic emission.

In some embodiments, the photophysical property on which is based the temperature calculation is the fluorescence intensity.

Advantageously, the photophysical property on which is based the temperature calculation is the excited state lifetime.

It is important to underline that the coordination complexes defined above have surprisingly shown suitable photophysical properties for their use in temperature measurements. In particular, since the complexes undergo surprisingly high variations of the photophysical properties depending on the temperature changes, the complexes themselves can be used to measure temperature variations (in the range −80° C. to +80° C.) smaller than 0.1° C., at room temperature and at physiological temperature around 37° C. with an error of circa 0.02° C.

These abilities are definitely ameliorative with respect to that properties of known systems that have, instead, a sensitivity definitely worse and of circa 0.5° C. (C. Gota, K. Okabe, T. Funatsu, Y. Harada, S. Uchiyama, "Hydrophilic Fluorescent Nanogel Thermometer for Intracellular Thermometry", J. Am. Chem. Soc. 2009, 131, 2766-2767; C. Gota, S. Uchiyama, T. Yoshihara, S. Tobita, T. Ohwada, "Temperature-Dependent Fluorescence Lifetime of a Fluorescent Polymeric Thermometer, Poly(N-isopropylacrylamide), Labeled by Polarity and Hydrogen Bonding Sensitive 4-Sulfamoyl-7-aminobenzofurazan", J. Phys. Chem. B 2008, 112, 2829-2836).

It has to be noted, moreover, that the photophysical properties (in particular, lifetimes and emission intensity) of the above identified complexes are substantially independent from operating conditions such as for example the phase of the complex (solid or in solution), the kind of the possible solvent (including water) if any, the presence or absence of oxygen.

In addition to these properties, these other advantages offered by the present invention can be listed:
1) a very high chemical and photochemical stability;
2) relatively low costs for the synthesis of the material;
3) possibility of use both in the solid state and in solution;
4) the possibility to determine the temperature measuring the lifetime allows to avoid internal standards that are instead necessary in fluorescence measurements. The lifetime range (100 ns-10 ms) does not require detection techniques involving instruments particularly large and expensive.

It is also important to underline that the photophysical properties of the above identified complexes were not at all predictable on the basis of the documents on the state of the art available to the inventors.

The possibility to monitor the temperature with nanometric devices allows many advantages, for example the possibility to monitor natural systems also at sub-cellular level or very small artificial systems, down to the level of the memory units of the modern computers. Moreover, being the input stimuli of luminous nature, it is possible to prepare very small and ultra-portable devices. This allows to prefigure the employ in the following application fields:
1) Cell Biology and, consequently, medical diagnostics. The ability to determine the temperature at the subcellular level can indeed help you understanding some biochemical processes; it is also known that tumor cells or inflamed tissue have different temperatures than those of healthy tissue.
2) Studies of heat dissipation in circuits of micro- and nano-electronics, very important parameter for the development of high-density devices such as those required by current and future market.
3) An application in the field of smart textiles sometimes provides continuous detection of the temperature: with this invention it is possible to think of devices that meet the requirements of miniaturization and cost required. In particular, we suggest the use in the medical field, in the sport fields in particular for long duration activities (cycling, marathon) or in airspace fields.
4) In the pharmaceutical and food industry, when it is necessary to know the thermal history of a sample.
5) In the replacement of mercury clinical thermometers.

Additional features of the present invention will be proven from the following description of some examples merely illustrative and not restrictive.

EXAMPLE 1

Synthesis

The coordination complexes $Cu_2\{Cu\text{-}(MeSNS)\}_3]^{2+}$, $[Ag_2\{Cu\text{-}(MeSNS)\}_3]^{2+}$, $[Ag_2\{Ag\text{-}(MeSNS)\}_3]^{2+}$, $[Cu_2\{Cu\text{-}(EtSNS)\}_3]^{2+}$, $[Ag_2\{Cu\text{-}(EtSNS)\}_3]^{2+}$ e $[Ag_2\{Ag\text{-}(EtSNS)\}_3]^{2+}$ were prepared using the methodology described in R. Pattacini, L. Barbieri, A. Stercoli, D. Cauzzi, C. Graiff, M. Lanfranchi, A. Tiripicchio, L. Elviri, "Zwitterionic metalates of group elements and their use as metalloligands for the assembly of multizwitterionic clusters", J. Am. Chem. Soc, 2006, 128, 866-876.

Figure 10:
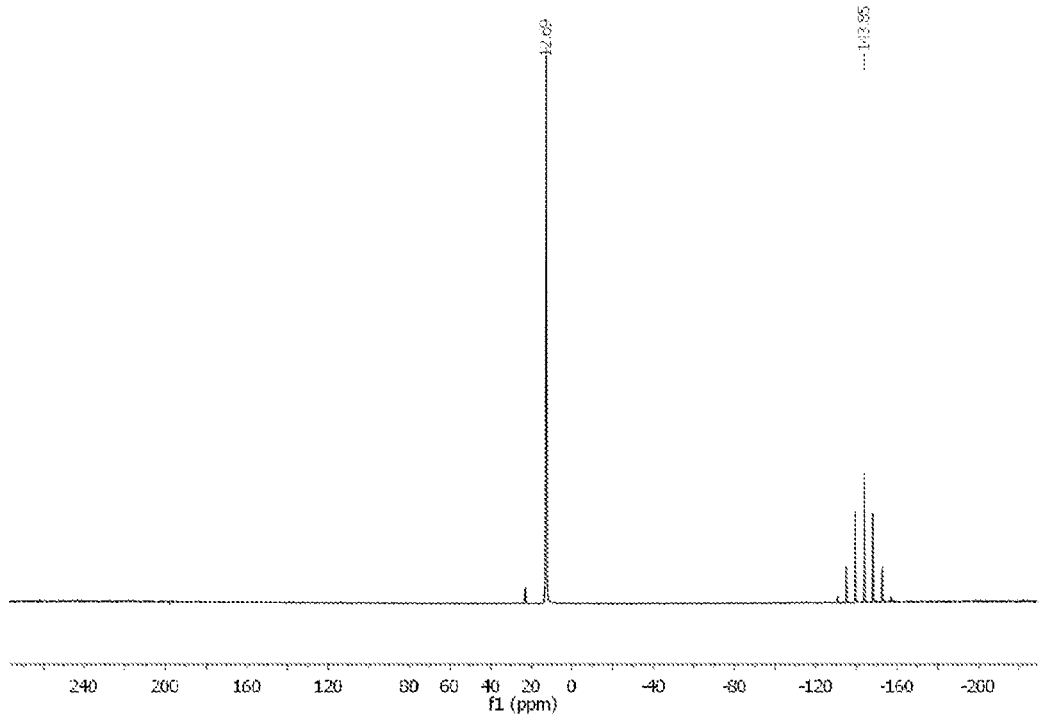
FIG. 10 shows the $^{31}$P-NMR spectrum of DoDecSNS.
Figure 11:
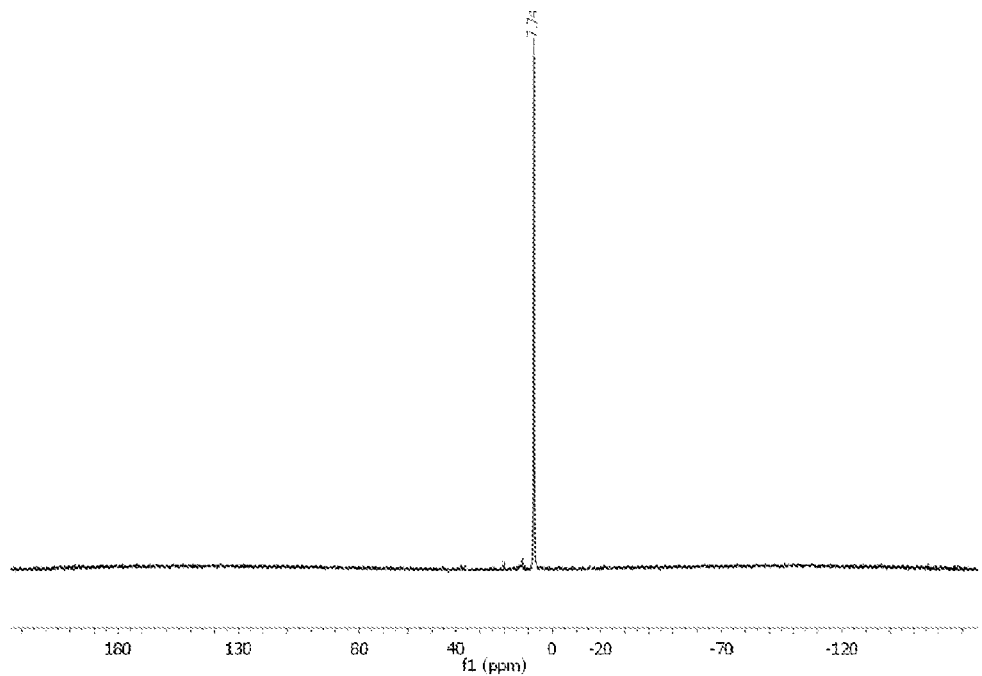
FIG. 11 shows the $^{31}$P-NMR spectrum of $[Cu_2\{Cu(DoDecSNS)\}_3]^{2+}$.

Following the same methodology, but using dodecyl-isothiocyanate as the starting compound, the following complexes were synthesized: $[Cu_2\{Cu\text{-}(DoDecSNS)\}_3]^{2+}$, $[Ag_2\{Cu\text{-}(DoDecSNS)\}_3]^{2+}$, $[Ag_2\{Ag\text{-}(DoDecSNS)\}_3]$. FIG. 10 shows the $^{31}$P-NMR spectrum of HDoDecSNS. FIG. 11 shows the $^{31}$P-NMR spectrum of $[Cu_2\{Cu\text{-}(DoDecSNS)\}_3]^{2+}$ the resonance at 12.7 is the cluster (the six phosphorus atoms it contains are all equivalent), the resonance at −143.8 is the $PF_6^-$ anion.

EXAMPLE 2

Photophysical Measurements

The UV-Vis absorption spectra were performed on a Perkin-Elmer Lambda 45 spectrophotometer.

Corrected emission spectra and correct excitation spectra were recorded with an Edinburgh FLS920 equipped with a Hamamatsu R928P photomultiplier.

The same instrument connected to a PCS900 PC card was used for the time-correlated single-photon counting (TCSPC) experiments.

Quantum yields were determined comparing the emission spectra of the compounds, recorded in air-equilibrated solutions (absorbance <0.1 at the excitation wavelength to avoid auto-absorption), to that of $[Ru(bpy)_3]^{2+}$ in water solution, $\phi$=0.028, used as standard solution. [M. Montalti, A. Credi, L. Prodi, M. T. Gandolfi, Handbook of Photochemistry; CRC Press: Boca Raton, Fla., 2006; p 574]

Emission and excited-state lifetimes in a rigid matrix at 77 K were recorded using glass tubes immersed in a Dewar filled with liquid nitrogen. Excited-state lifetimes at 77 K were recorded with a nanosecond flash photolysis setup previously described (Nd:YAG Continuum, Surelite, Third harmonics, $\lambda_{exc}$=355 nm, pulse width ca 7 ns and energy≤1 mJ pulse$^{-1}$). Measurements of emission spectra and lifetimes as a function of temperature were performed by inserting a quartz cell in a cryostat equipped with a temperature controller (model TC1) by Oxford Instruments; laser excitation at 405 nm. Experimental errors: absorption maxima, ±2 nm; emission maxima, ±2 nm; excited state lifetimes, ±10%; fluorescence quantum yields, ±20%.

Quartz cuvettes with optical path length of 1 cm were used for solution measurements. When necessary, deoxygenated samples were prepared by flowing $N_2$ in the solutions in a customized airtight quartz cuvette equipped with a screw cap. Solid samples were placed between two non-fluorescent glass plates.

Results of experiments performed on $[Cu_2\{Cu\text{-}(EtSNS)\}_3]^{2+}$ are shown in FIGS. 5-9.

Figure 5:
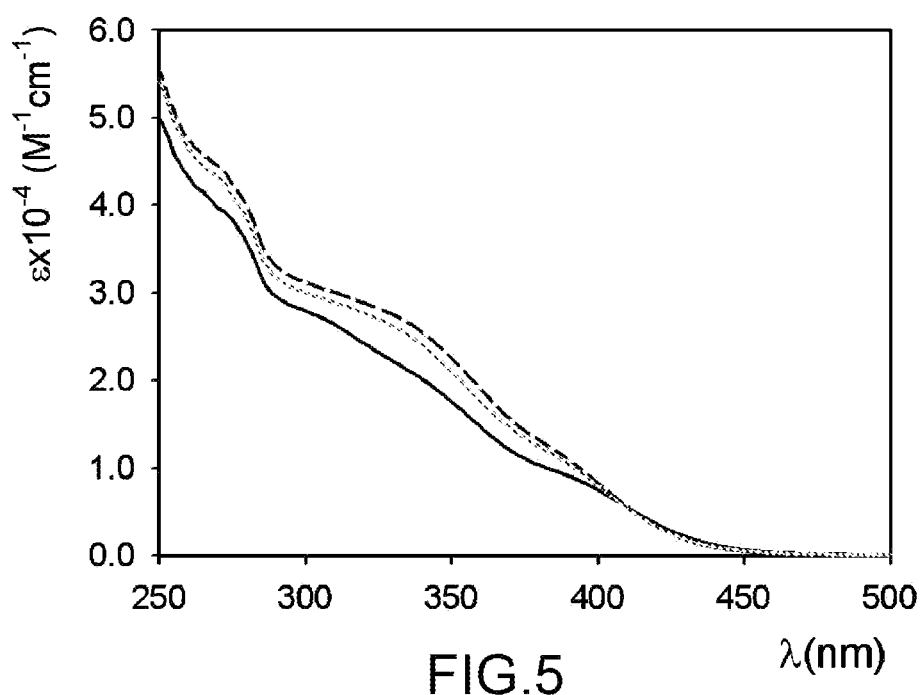
FIG. 5 shows some absorption spectra of a coordination complex used in the present invention.

In particular, FIG. 5 shows the absorption spectrum in water at room temperature (solid line), in dichloromethane at room temperature (dotted line), in EtOH:MeOH at room temperature (dotted line).

Figure 6:
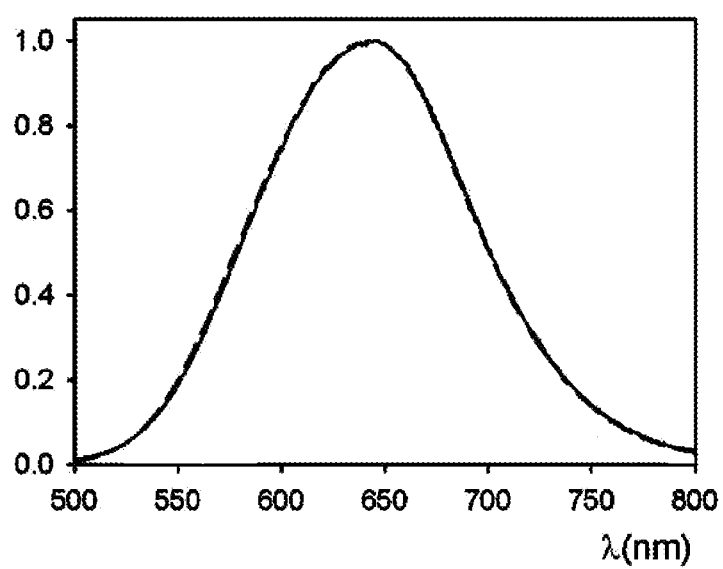
FIG. 6 shows some emission spectra of the complex of FIG. 1 recorded upon excitation at 405 nm at room temperature (298 Kelvin)

FIG. 6 shows the emission spectrum upon excitation at 405 nm at room temperature in water (solid line), dichloromethane (dotted line), in EtOH:MeOH (dotted line). In this figure, in the ordinate axis is shown the intensity in arbitrary unit.

Figure 7:
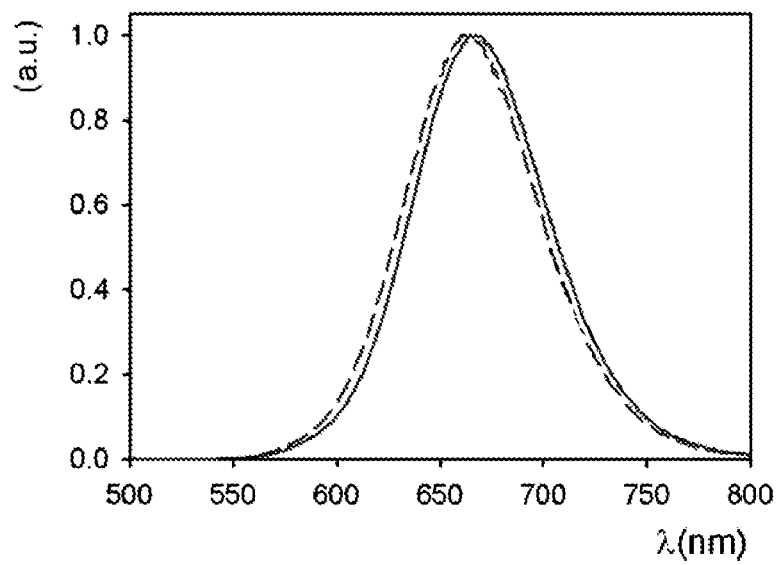
FIG. 7 shows the emission spectra of the complex of FIG. 1 recorded upon excitation at 405 nm at 77 Kelvin.

FIG. 7 shows the emission spectrum upon excitation at 405 nm at 77 K in water (1% w/w SDS) (solid line), dichloromethane (dotted line), in EtOH:MeOH (line dots). In this figure, in the ordinate axis is shown the intensity in arbitrary unit.

Figure 8:
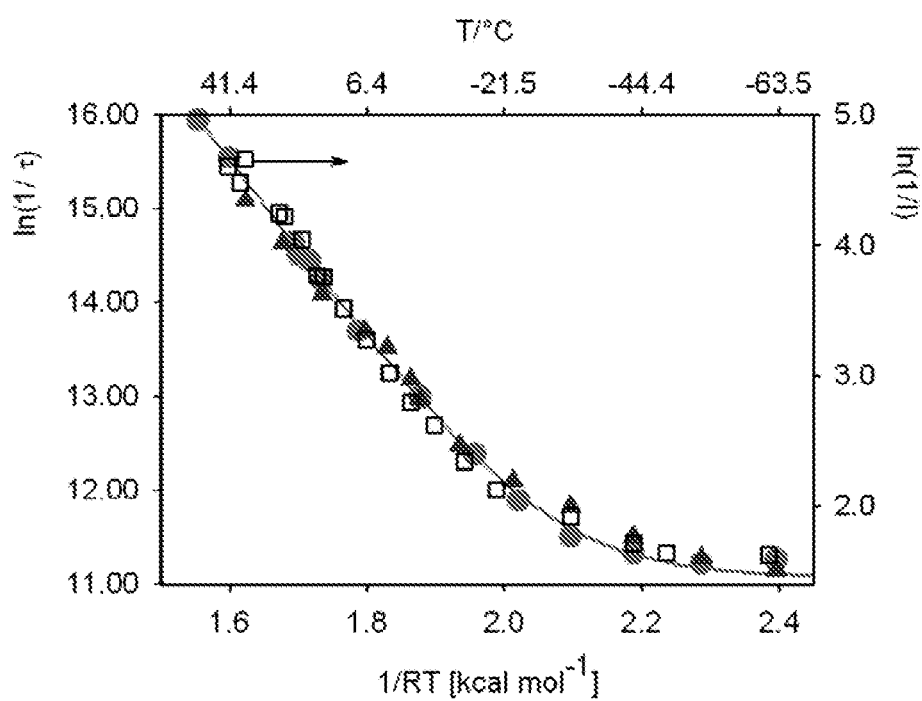
FIG. 8 shows Arrhenius plots for lifetimes and luminescence intensity of the complex of FIG. 1.

FIG. 8 shows the Arrhenius plots (Arrhenius plots) in dichloromethane for the lifetimes (circles - ● - with ordinate axis on the left) and for the luminescence intensity (square - ☐ - with ordinate axis on the right), and for lifetimes in the solid state (triangles - Δ - with ordinate axis on the left). In this figure, τ is the lifetime, I is the intensity, R is the gas constant, τ is the temperature in K.

Figure 9:
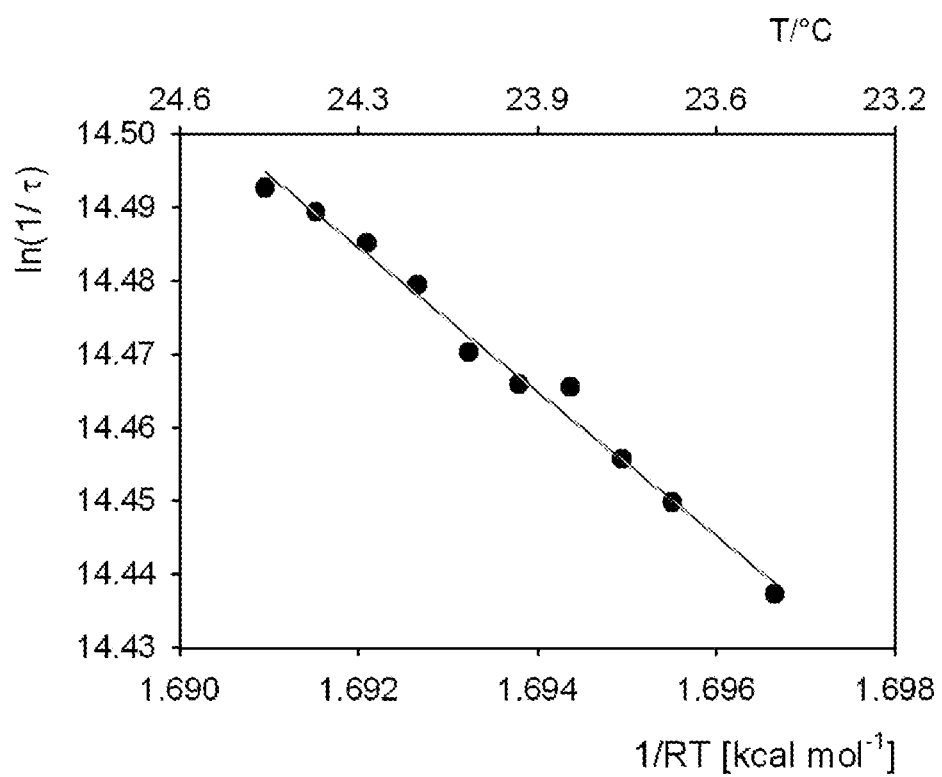
FIG. 9 shows an Arrhenius plot for lifetimes of the complex of FIG. 1 for a variation of 1 degree of temperature around 298 (±1) K.

FIG. 9 shows the Arrhenius plot for lifetimes in water. In this figure, τ is the lifetime, R is the gas constant, T is the temperature in K.

The data used for the preparation of FIGS. 8 and 9 are reported in Tables 1 and 2, respectively.

TABLE 1

| 1/RT [molKcal$^{-1}$] | ln(1/I)_CH$_2$Cl$_2$ | 1/RT [molKcal$^{-1}$] | ln(1/τ)CH$_2$Cl$_2$ | 1/RT [molKcal$^{-1}$] | ln(1/τ)solid |
|---|---|---|---|---|---|
| 2.38 | 1.63 | 2.65 | 11.41 | 2.80 | 10.85 |
| 2.24 | 1.63 | 2.49 | 11.32 | 2.65 | 10.89 |
| 2.19 | 1.72 | 2.40 | 11.26 | 2.52 | 11.03 |
| 2.10 | 1.92 | 2.29 | 11.22 | 2.40 | 11.14 |
| 1.99 | 2.12 | 2.19 | 11.33 | 2.29 | 11.28 |
| 1.94 | 2.34 | 2.10 | 11.50 | 2.19 | 11.50 |
| 1.90 | 2.61 | 2.02 | 11.89 | 2.10 | 11.82 |
| 1.86 | 2.79 | 1.96 | 12.38 | 2.01 | 12.10 |
| 1.83 | 3.03 | 1.88 | 12.99 | 1.94 | 12.47 |
| 1.80 | 3.28 | 1.79 | 13.70 | 1.88 | 12.96 |
| 1.77 | 3.52 | 1.74 | 14.24 | 1.86 | 13.18 |
| 1.74 | 3.75 | 1.72 | 14.44 | 1.83 | 13.51 |
| 1.73 | 3.77 | 1.70 | 14.51 | 1.80 | 13.70 |
| 1.71 | 4.04 | 1.69 | 14.64 | 1.74 | 14.09 |
| 1.68 | 4.22 | 1.60 | 15.54 | 1.68 | 14.63 |
| 1.67 | 4.25 | 1.56 | 15.94 | 1.62 | 15.09 |
| 1.62 | 4.65 | | | | |
| 1.62 | 4.48 | | | | |
| 1.60 | 4.61 | | | | |

TABLE 2

(ΔT = 1° C. −25° −26° C.)

| 1/RT [kcal mol$^{-1}$] | ln(1/τ) |
|---|---|
| 1.6967 | 14.4372 |
| 1.6955 | 14.4498 |
| 1.6949 | 14.4556 |
| 1.6944 | 14.4655 |
| 1.6938 | 14.4659 |
| 1.6932 | 14.4702 |
| 1.6927 | 14.4794 |
| 1.6921 | 14.4851 |
| 1.6915 | 14.4893 |
| 1.6910 | 14.4927 |

In the table 3 below are reported the lifetimes of some complexes in $CH_2Cl_2$ at different temperatures.

TABLE 3

| | (ns) in CH$_2$Cl$_2$ | | | | |
|---|---|---|---|---|---|
| Temp (K) | $[Cu_2\{Cu\text{—}(EtSNS)\}_3]^{2+}$ | Temp (K) | $[Ag_2\{Cu\text{—}(EtSNS)\}_3]^{2+}$ | Temp (K) | $[Ag_2\{Ag\text{—}(EtSNS)\}_3]^{2+}$ |
| 220.00 | 13350.00 | 220.00 | 2029.33 | 220.00 | 1171.90 |
| 230.00 | 12020.00 | 230.00 | 2741.41 | 230.00 | 1194.00 |

TABLE 3-continued

| | | | (ns) in $CH_2Cl_2$ | | |
|---|---|---|---|---|---|
| Temp (K) | $[Cu_2\{Cu\text{—}(EtSNS)\}_3]^{2+}$ | Temp (K) | $[Ag_2\{Cu\text{—}(EtSNS)\}_3]^{2+}$ | Temp (K) | $[Ag_2\{Ag\text{—}(EtSNS)\}_3]^{2+}$ |
| 240.00 | 10080.00 | 239.00 | 4460.58 | 240.00 | 1152.05 |
| 249.00 | 6847.00 | 249.00 | 6410.89 | 250.00 | 1159.65 |
| 257.00 | 4199.00 | 259.00 | 2739.00 | 260.00 | 1139.45 |
| 268.00 | 2292.00 | 269.00 | 3996.28 | 270.00 | 1123.50 |
| 281.50 | 1125.00 | 270.00 | 4188.98 | 270.00 | 1134.20 |
| 290.00 | 652.30 | 279.00 | 2957.94 | 270.00 | 1139.10 |
| 293.00 | 535.60 | 289.00 | 2068.08 | 279.00 | 1139.25 |
| 296.00 | 500.80 | 296.00 | 1672.34 | 279.00 | 1123.55 |
| 297.00 | 439.13 | 299.00 | 1517.93 | 280.00 | 1168.25 |
| 314.50 | 178.20 | | | 280.00 | 1119.35 |
| 323.50 | 119.20 | | | 289.00 | 1151.75 |
| | | | | 289.00 | 1210.40 |
| | | | | 289.00 | 1139.60 |
| | | | | 291.00 | 1156.65 |
| | | | | 300.00 | 1162.75 |
| | | | | 300.00 | 1126.80 |
| | | | | 301.00 | 1127.70 |
| | | | | 303.00 | 1092.40 |

Figure 12:
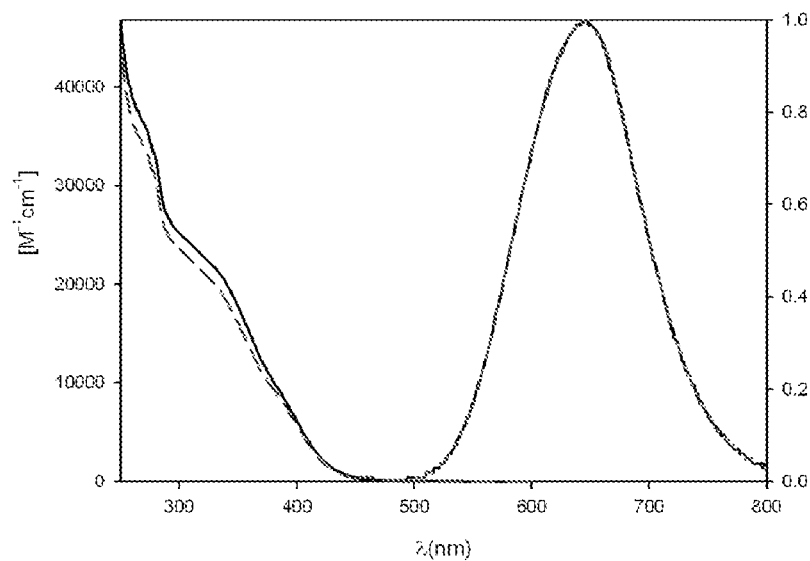
FIG. 12 shows: on the right side, the emission spectrum upon excitation at 405 nm at room temperature in dichloromethane (solid line) and in EtOH:MeOH (dashed line) of $[Cu_2\{Cu(DoDecSNS)\}_3]^{2+}$ (indicated in the ordinate axis is the intensity in arbitrary units, the abscissa axis shows the wavelength); on the left side, the absorption spectrum in dichloromethane at room temperature (solid line) and in EtOH:MeOH at room temperature (dashed line) (on the ordinate axis is indicated the $\epsilon$, on the abscissa axis, the wavelength).

The FIG. 12, right side, shows the emission spectrum of $[Cu_2\{Cu\text{-}(DoDecSNS)\}_3]^{2+}$ upon excitation at 405 nm at room temperature in dichloromethane (solid line) and in EtOH:MeOH (dashed line). In this figure (on the right), the ordinate axis shows the intensity in arbitrary unit; in the abscissa one, the wavelength.

The FIG. 12, on the left, shows the absorption spectrum of $[Cu_1\{Cu\text{-}(DoDecSNS)\}_3]^{2+}$ in dichloromethane at room temperature (solid line) and in EtOH:MeOH at room temperature (dashed line).

Figure 13:
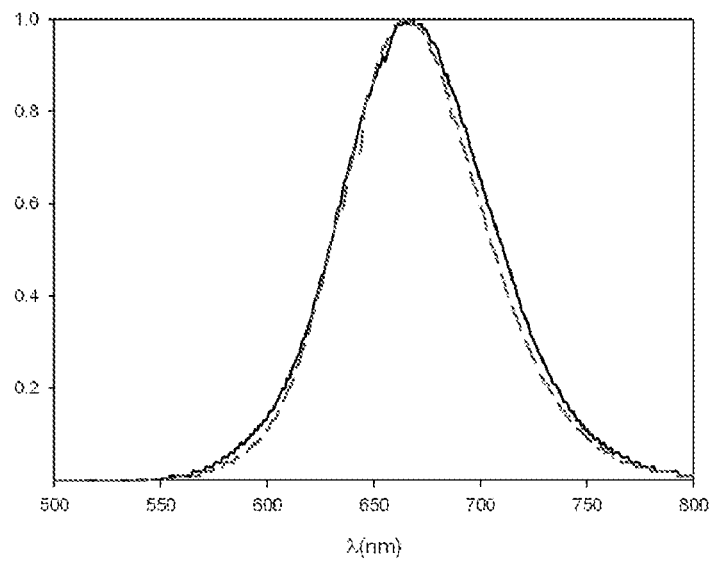
FIG. 13 illustrates the emission spectrum upon excitation at 405 nm at a temperature of 77 K in dichloromethane (solid line) in EtOH:MeOH (dashed line) of $[Cu_2\{Cu(DoDecSNS)\}_3]^{2+}$ (shown in the ordinate is the intensity in arbitrary units, the abscissa shows the wavelength).

The FIG. 13 shows the emission spectrum of $[Cu_2\{Cu\text{-}(DoDecSNS)\}_3]^{2+}$ upon excitation at 405 nm at 77 K in dichloromethane (solid line) and in EtOH:MeOH (dashed line). In this figure, the ordinate axis shows the intensity in arbitrary unit.

Example 3

Quantistic Analysis of $[Cu_2\{Cu\text{-}(MeSNS)\}_3]^{2+}$

Quantum chemistry can quantitatively describe the electronic states. TD-DFT calculations (Time Dependent Functional Theory) were carried out on $[Cu_2\{Cu\text{-}(MeSNS)\}_3]^{2+}$, whose structural data are available in solid (Pattacini R., L. Barbieri, A. Stercoli, Cauzzi D., C. Graiff, M. Lanfranchi, A. Tiripicchio, L. Elvira, "Zwitterionic metalates group of 11 elements and Their use as metalloligands for the assembly of multizwitterionic clusters", J. Am. Chem. Soc, 2006, 128, 866-876) at the B3LYP level with the SV(P) basis set as implemented in the program Turbomole V5.10 (AD Becke, "Density-functional thermochemistry 0.3. the role of exact exchange", J. Chem. Phys. 98, 5648-5652 (1993); F F Rappoport, Rappoport D. "Density functional methods for excited states: equilibrium structure and electronic spectra: In Computational photochemistry, M. Ed Olivucci, Elsevier, Amsterdam, 2005, p. 93, A. Schäfer, H. Horn and R. Ahlrichs, "Fully optimized contracted Gaussian-basis sets for atoms Li to Kr," J. Chem. Phys. 97, 2571-2577 (1992), R. Ahlrichs, M. Bär, M. Haser, H. Horn, C. Kölmel "Electronic Structure Calculations on Workstation Computers: The Program System Turbomole", Chem. Phys. Lett 162, 165-169 (1989)).

Between 500 and 800 nm, there are seven singlet excited electronic states localized at 438, 435, 407, 404, 382, 378, 365 nm. They all have oscillator strengths (oscillator strengths), $f_0$, from medium to low, for the transition to the ground state. From S1 to S7 $f_0$ values are 0.0106, 0.0031, 0.0919, 0.0818, 0.0446, 0.0491, 0.0052.

Consistently, the initial molecular orbital of all transitions is located in the cluster $CU_5$. For the first six singlet excited states the final orbital is the LUMO, centered on the metal (FIG. 3), while for S7 is the LUMO+1 centered on the ligand (FIG. 4). In $[Cu_2\{Cu\text{-}(MeSNS)\}_3]^{2+}$ the three ligands wrap the five metal atoms.

A Löwdin population analysis (Löwdin population analysis—P.-O. Löwdin. J. Chem. Phys. 18 (1950), p. 365.) of the LUMO showed that the total density of the five Cu atoms and of the S and N atoms bound to the cluster is 50.6%. A Löwdin population analysis of the LUMO+1 showed that the total density of the five Cu atoms and of the S and N atoms bound to the cluster is 9.2%.

The excited states centered on the cluster interact weakly with the external environment and are less prone to decay than an excitation involving ligands.

The invention claimed is:

1. A method for measuring temperatures using a coordination complex, the coordination complex comprising at least two metal atoms bonded to one another, at least one ligand, and at least two heteroatoms, which form respective coordination bonds with at least one respective metal atom; the complex having a LUMO with a density computed by Löwdin population analysis on the metal atoms and on the heteroatoms higher than 48% and a LUMO+1 with a density computed by Löwdin population analysis on the metal atoms and heteroatoms lower than 20%; the coordination complex having at least one excited state on the LUMO, and at least one excited state on the LUMO+1; the coordination complex emits emitting at a determined wavelength when it passes from the excited state on the LUMO to the ground state.

2. The method according to claim 1, wherein a sum of the oscillator strengths ($f_0$) of the excited states on the LUMO is at least 20 times more than a sum of the oscillator strengths ($f_0$) of the excited states on the LUMO+1.

3. The method according to claim 1, wherein the coordination complex has the following formula I:

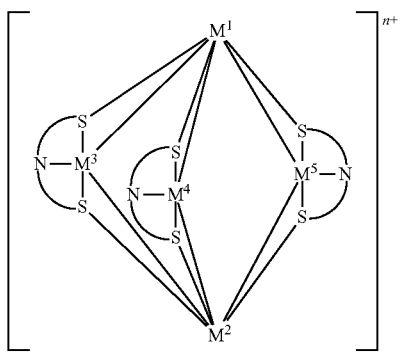
(I)

or geometrical isomers thereof, optically active forms thereof, diastereoisomers, racemic forms thereof,
wherein $M^1$, $M^2$, $M^3$, $M^4$, $M^5$ are each selected, independently of the others, from the group consisting of: $Cu^I$, $Ag^I$, $Au^I$, $Pd^{II}$ $Rh^I$;
n is equivalent to the sum of the oxidation states of $M^1$, $M^2$, $M^3$, $M^4$, $M^5$ minus 3;
each portion II

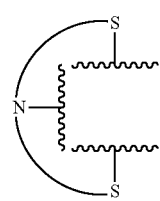
(II)

represents a respective tridentate ligand having formula III:

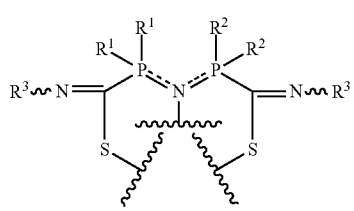
(III)

wherein $R^1$ is selected from the group consisting of: Ph, $C_1$-$C_4$ alkyl, $C_1$-$C_4$ haloalkyl, substituted phenyl;
$R^2$ is selected from the group consisting of: Ph, $C_1$-$C_4$ alkyl, $C_1$-$C_4$ haloalkyl, substituted phenyl;
$R^3$ is selected from the group consisting of: $C_1$-$C_{20}$ alkyl, benzyl, substituted benzyl, $C_1$-$C_{20}$ hydroxy alkyl, $C_1$-$C_{20}$ alkoxysilane.

4. The method according to claim 3, wherein $R^2$ is selected from the group consisting of: Ph, $C_1$-$C_3$ alkyl, $C_1$-$C_3$ haloalkyl.

5. The method according to claim 3, wherein $R^1$ is selected from the group consisting of: Ph, $CH_3$, $CF_3$, $(CH_3)_2CH$—, $(CF_3)_2CH$—, $(CH_3)(CF_3)CH$—, p-Me($C_6H_4$)—, p-$CH_3O$($C_6H_4$)—, p-(t-Bu)($C_6H_4$)—, p-Cl($C_6H_4$)—, p-F($C_6H_4$)—, p-CN($C_6H_4$)—, p-Et($C_6H_4$)—, p-$CF_3$($C_6H_4$)—;
$R^2$ is selected from the group consisting of: Ph, $CH_3$, $CF_3$, $(CH_3)_2CH$—, $(CF_3)_2CH$—, $(CH_3)(CF_3)CH$—.

6. The method according to claim 3, wherein $M^1$, $M^2$, $M^3$, $M^4$, $M^5$ are selected, each independently of the others, from the group consisting of: $Cu^I$, $Ag^I$, $Au^I$;

n is 2;
$R^3$ is selected from the group consisting of: $C_1$-$C_{18}$ alkyl, benzyl, substituted benzyl.

7. The method according to claim 3, wherein $M^1$, $M^2$, $M^3$, $M^4$, $M^5$ are selected, each independently of the others, from the group consisting of: $Cu^I$, $Ag^I$;
$R^3$ is selected from the group consisting of: $C_1$-$C_{18}$ linear alkyl, $(CH_3)_2CH$—, $CH_3CH(CH_3)CH_2$—, $(CH_3)_3CH_2$—, $PhCH_2$—, $Ph_2CH$—, $Ph_3C$—, $Ph(CH_3)CH$—, $Ph(CH_3CH_2)CH$—, Ph(n-Pr)CH—, Ph(n-Bu)CH—, $Ph(CH_3)_2C$—, $Ph_2CH_3C$—, p-Me($C_6H_4$)$CH_2$—, p-$CH_3O$($C_6H_4$)$CH_2$—, p-(t-Bu)($C_6H_4$)$CH_2$—, p-$C_1$($C_6H_4$)$CH_2$—, p-F($C_6H_4$)$CH_2$—, p-CN($C_6H_4$)$CH_2$—, p-Et($C_6H_4$)$CH_2$—, p-$CF_3$($C_6H_4$)$CH_2$—.

8. The method according to claim 3, wherein
$R^1$ is Ph;
$R^2$ is Ph;
$R^3$ is a $C_1$-$C_{12}$alkyl.

9. The method according to claim 1, wherein $M^1$, $M^2$, $M^3$, $M^4$, $M^5$ are each selected, independently of the others, from the group consisting of: $Cu^I$, $Ag^I$, $Au^I$, $Pd^{II}$.

10. The method according to claim 1, wherein the organometallic complex is selected from the group consisting of: $[Cu_2\{Cu\text{-}(MeSNS)\}_3]^{2+}$, $[Ag_2\{Cu\text{-}(MeSNS)\}_3]^{2+}$, $[Ag_2\{Ag\text{-}(MeSNS)\}_3]^{2+}$, $[Cu_2\{Cu\text{-}(EtSNS)\}_3]^{2+}$, $[Ag_2\{Cu\text{-}(EtSNS)\}_3]^{2+}$, $[Ag_2\{Ag\text{-}(EtSNS)\}_3]^{2+}$, $[Cu_2\{Cu\text{-}(DoDecSNS)\}_3]^{2+}$, $[Ag_2\{Cu\text{-}(DoDecSNS)\}_3]^{2+}$, $[Ag_2\{Ag\text{-}(DoDecSNS)\}_3]^{2+}$, wherein MeSNS indicates:

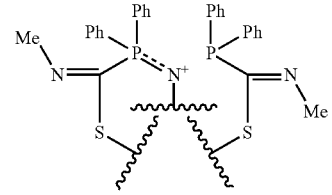

wherein Me indicates a methyl group; EtSNS indicates:

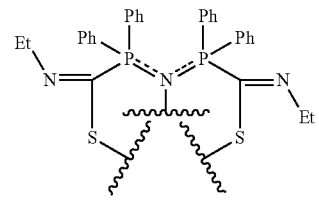

wherein Et indicates an ethyl group; DoDecSNS indicates:

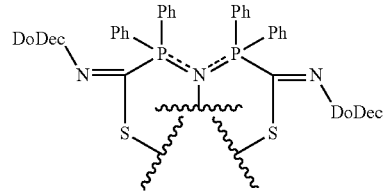

wherein DoDec indicates a dodecyl group ($C_{12}H_{25}$—).

11. The method according to claim 10, wherein the organometallic complex is selected from the group consisting of: $[Cu_2\{Cu\text{-}(MeSNS)\}_3]^{2+}$, $[Cu_2\{Cu\text{-}(EtSNS)\}_3]^{2+}$, $[Cu_2\{Cu\text{-}(DoDecSNS)\}_3]^{2+}$.

12. The method according to claim 1, comprising:
- a step of directing at least one electromagnetic radiation on the coordination complex;
- a step of detecting at least one electromagnetic emission of the coordination complex to which the electromagnetic radiation has been directed;
- a step of computing the temperature on the basis of a photophysical property of the coordination complex selected from the group consisting of: lifetime in the excited state (on LUMO); luminescence intensity of the electromagnetic emission.

13. The method according to claim 12, wherein the photophysical property, on the basis of which the temperature is computed, is the lifetime in the excited state on the LUMO.

14. The method according to claim 1, wherein the coordination complex is introduced into a biological substrate.

15. The method according to claim 14, wherein the step of detecting the electromagnetic emission of the coordination complex is performed with the aid of a fluorescence confocal microscope.

16. A device for measuring a temperature, comprising a coordination complex as defined in claim 1; an electromagnetic source to direct at least one electromagnetic radiation on the coordination complex; a detector to detect an electromagnetic emission of the coordination complex; and a control unit to compute the temperature on the basis of a photophysical property of the organometallic complex.

* * * * *

UNITED STATES PATENT AND TRADEMARK OFFICE
CERTIFICATE OF CORRECTION

PATENT NO. : 8,919,191 B2
APPLICATION NO. : 13/881557
DATED : December 30, 2014
INVENTOR(S) : Sara Bonacchi et al.

It is certified that error appears in the above-identified patent and that said Letters Patent is hereby corrected as shown below:

On the Title Page:

At item (75), line 3, "Zacheroni," should be -- Zaccheroni, --.

At item (75), line 6, "Daniele Cauzzi," should be -- Daniele Alessandro Cauzzi, --.

In the Claims:

At Column 14, line 59, "emits emitting" should be -- emitting --.

At Column 15, line 21, "$Pd^{II}\ Rh^{I}$;" should be -- $Pd^{II}$, $Rh^{I}$; --.

Signed and Sealed this
Tenth Day of November, 2015

Michelle K. Lee
*Director of the United States Patent and Trademark Office*